(12) United States Patent
Chen et al.

(10) Patent No.: US 10,938,209 B2
(45) Date of Patent: Mar. 2, 2021

(54) FAULT RIDE-THROUGH CIRCUIT WITH VARIABLE FREQUENCY TRANSFORMER AND CONTROL METHOD THEREOF

(71) Applicant: GUANGDONG UNIVERSITY OF TECHNOLOGY, Guangzhou (CN)

(72) Inventors: Sizhe Chen, Guangzhou (CN); Jiahao Lu, Guangzhou (CN); Guidong Zhang, Guangzhou (CN); Yuanmao Ye, Guangzhou (CN); Yun Zhang, Guangzhou (CN); Miao Zhang, Guangzhou (CN)

(*) Notice: Subject to any disclaimer, the term of this patent is extended or adjusted under 35 U.S.C. 154(b) by 83 days.

(21) Appl. No.: 16/252,636

(22) Filed: Jan. 20, 2019

(65) Prior Publication Data

US 2019/0190263 A1 Jun. 20, 2019

Related U.S. Application Data

(63) Continuation of application No. PCT/CN2018/080591, filed on Mar. 27, 2018.

(51) Int. Cl.
| | |
|---|---|
| *H02M 1/32* | (2007.01) |
| *H02J 3/02* | (2006.01) |
| *H02J 3/12* | (2006.01) |
| *H02J 3/00* | (2006.01) |

(52) U.S. Cl.
CPC ............ *H02J 3/02* (2013.01); *H02J 3/12* (2013.01); *H02M 1/32* (2013.01); *H02J 3/001* (2020.01); *H02M 2001/325* (2013.01)

(58) Field of Classification Search
CPC .... H02J 3/02; H02J 3/12; H02J 3/001; H02M 1/32; H02M 2001/325; H02M 5/4585; H02M 5/38; H02M 2001/0022; H02M 2007/53876; H02M 2001/0019
See application file for complete search history.

(56) References Cited

U.S. PATENT DOCUMENTS

| | | | |
|---|---|---|---|
| 5,127,085 A | 6/1992 | Becker et al. | |
| 9,203,242 B2 * | 12/2015 | Wang | H02J 3/383 |
| 2012/0049805 A1 | 3/2012 | Panosyan et al. | |

(Continued)

OTHER PUBLICATIONS

Ambati, et.al, "A Hierarchical Control Strategy With Fault Ride-Through Capability for Variable Frequency Transformer" IEEE Transactions on Energy Conversion, vol. 30, No. 1, Mar. 2015 pp. 132-141 (Year: 2015).*

*Primary Examiner* — Pinping Sun
(74) *Attorney, Agent, or Firm* — Erson IP (Nelson IP)

(57) ABSTRACT

A fault ride-through circuit with a variable frequency transformer (VFT) and a control method thereof are provided, and the control method comprises: pretreating acquired voltages of grids, a voltage of a stator interface and a voltage of a rotor interface to obtain a rotor voltage DC component and a rotor voltage DC component; testing and treating a voltage frequency of a first grid and a voltage frequency of a second grid; carrying out a reference voltage calculation for a stator voltage DC component, a rotor voltage DC component, the voltage frequencies of the first grid and the second grid to obtain a positive voltage reference value of the first PWM convertor and the second PWM convertor; and processing the voltage reference values to obtain the switch signals for controlling the first PWM convertor and the second PWM convertor.

7 Claims, 6 Drawing Sheets

(56) References Cited

U.S. PATENT DOCUMENTS

| | | | | |
|---|---|---|---|---|
| 2012/0112708 A1* | 5/2012 | Park | ............ | H02P 9/007 |
| | | | | 322/25 |
| 2013/0010505 A1* | 1/2013 | Bo | ............ | H02J 3/381 |
| | | | | 363/37 |
| 2013/0265809 A1* | 10/2013 | Gupta | ............ | H02J 3/386 |
| | | | | 363/131 |
| 2015/0077067 A1* | 3/2015 | Kanjiya | ............ | H02H 7/067 |
| | | | | 322/21 |
| 2015/0333679 A1* | 11/2015 | Box | ............ | H02P 9/302 |
| | | | | 310/68 D |
| 2016/0041567 A1* | 2/2016 | Ko Thet | ............ | H02P 9/42 |
| | | | | 290/7 |
| 2016/0094117 A1 | 3/2016 | Hu et al. | | |
| 2019/0386571 A1* | 12/2019 | Dincan | ............ | H02M 1/08 |

\* cited by examiner

FAULT RIDE-THROUGH CIRCUIT WITH VARIABLE FREQUENCY TRANSFORMER AND CONTROL METHOD THEREOF

CROSS-REFERENCE TO RELATED APPLICATIONS

This application is a continuation of International Patent Application No. PCT/CN2018/080591 with a filing date of Mar. 27, 2018, designating the United States, now pending, and further claims priority to Chinese Patent Application No. 201711364222.1 with a filing date of Dec. 18, 2017. The content of the aforementioned applications, including any intervening amendments thereto, are incorporated herein by reference.

TECHNICAL FIELD

The disclosure relates to the technical field of asynchronous interconnection between grids, and particularly to a control method of a fault ride-through circuit with variable frequency transformer (VFT) and the fault ride-through circuit with the VFT.

BACKGROUND OF THE PRESENT INVENTION

With continuous constructions of grids, various countries are capable of sharing power resources through grids. The grids with different frequencies could be interconnected by variable frequency transformers (VFTs). There are plenty of advantages by adopting the VFT for asynchronous interconnection between grids, such as simple to control, excellent overloading capability, no phase-shifting failure, high reliability, no harmonics produced, better power quality, and moreover, it has greater natural damping and inertia support for improving the stability of grids.

However, the VFT cannot block grid fault propagation. For example, when a short-circuit fault happens at one side grid of the VFT causing the voltage magnitudes dip, the other side grid will transfer gigantic short-circuit current to the fault grid through the VFT, and thereby affecting the secure running of the healthy side grid. In addition, excessive short-circuit current and asymmetrical three-phase circuit can lead to the breakdown of the VFT.

Figure 1:
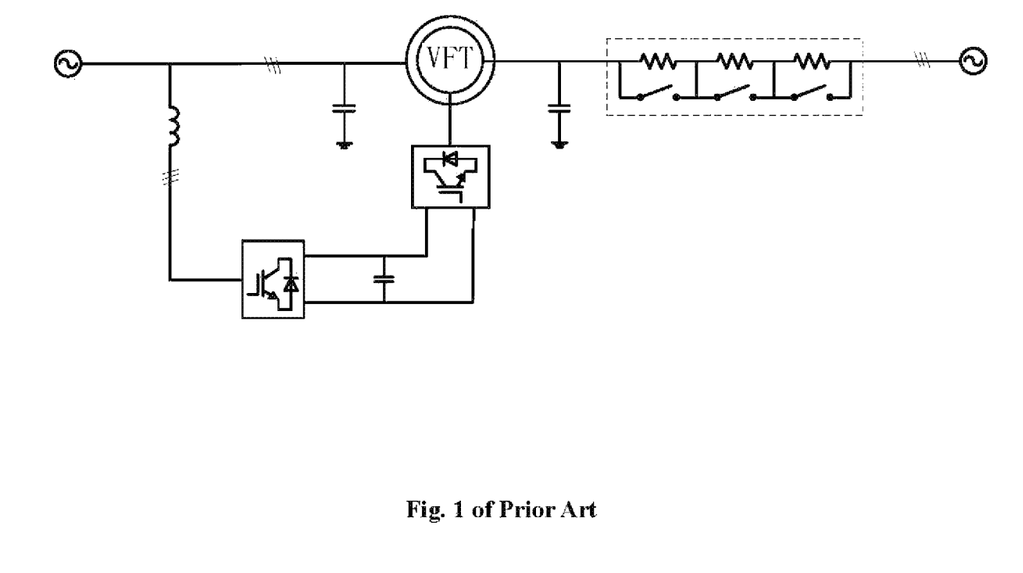
FIG. 1 is a structural schematic diagram of a fault ride-through device with a VFT in the prior art.

Referring to FIG. 1, FIG. 1 is a structural diagram of a fault ride-through device with a VFT in the prior art.

In general, the series dynamic breaking resistor (SDBR) is mainly adopted to block the fault propagation in realizing the fault ride-through of VFT. When both grids are running normally, all of the series dynamic breaking resistors are short-circuited by by-pass switches.

While voltage dip happens at one side grid, the corresponding switches will be disconnected according to the various levels of voltage dip to insert SDBRs into circuit, so as to suppress abnormal current rise caused by short-circuit fault, improve the terminal voltage of the VFT and avoid the fault propagation from the fault side grid to the healthy side grid.

Although the SDBRs can be combined to deal with various levels of grid faults, the limited combinations cannot realize absolute compensation of the VFT terminal voltage, and have limited effects and low efficiency in controlling the short-circuit current. Moreover, when voltage dip happens at one side grid, torque fluctuation of the VFT will be caused, shortening the life of mechanical components and producing huge noise pollution.

Accordingly, how to control the VFT when grid voltage dip happens in a better way is a significant problem those of ordinary skill in the art focus on.

SUMMARY OF PRESENT INVENTION

The object of this disclosure is to provide a control method of a fault ride-through circuit with a VFT and the fault ride-through circuit with the VFT. When the grid voltage dip happens, compensating circuits are used to compensate the voltage, further to raise the voltage, decrease short-circuit current, so as to avoid excessive current wastage and prevent the voltage dip fault from propagating to the healthy grid.

In order to solve above technical problems, this disclosure provides a control method of a fault ride-through circuit with the VFT. The fault ride-through circuit with the VFT, comprises: a first grid, a second grid, a variable frequency transformer (VFT), a first compensating transformer and a first pulse width modulation (PWM) convertor; the first grid is connected to a stator interface of the VFT through secondary coils of the first compensating transformer, primary coils of the first compensating transformer are inserted in series between a first output end and a second output end of the first PWM convertor, and a rotor interface of the VFT is connected to the second grid. The control method comprises the following steps:

S101: pretreating a voltage of the first grid $U_{g1abc}$, a voltage of the second grid $U_{g2abc}$, a voltage of the stator interface of the VFT $U_{sabc}$ and a voltage of the rotor interface $U_{rabc}$ to obtain a stator positive sequence voltage DC component $U_{sdq+}$, a stator negative sequence voltage DC component $U_{sdq-}$, a rotor positive sequence voltage DC component $U_{rdq+}$ and a rotor negative sequence voltage DC component $U_{rdq-}$;

S102: testing and treating the voltage of the first grid $U_{g1abc}$ and the voltage of the second grid $U_{g2abc}$ with a dipital phase-locked loop to obtain a voltage frequency of the first grid $f_{g1}$ and a voltage frequency of the second grid $f_{g2}$;

S103: carrying out a reference voltage calculation to the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ to obtain a positive voltage reference value $U_{t1dq+}$ and a negative voltage reference value $U_{t1dq-}$ of the first PWM convertor; and S104: processing the voltage reference values $U_{t1dq+}$ and $U_{t1dq-}$ to obtain switch signals for controlling the first PWM convertor $S_a$, $S_b$, $S_c$.

Optionally, the step S101 further comprises: acquiring the voltage of the first grid $U_{g1abc}$, the voltage of the second grid $U_{g2abc}$, the voltage of the stator interface $U_{sabc}$ and the voltage of the rotor interface $U_{rabc}$ by a voltage sensor; carrying out three-phase static to two-phase static coordinate transformation to the voltage of the first grid $U_{g1abc}$, the voltage of the second grid $U_{g2abc}$, the voltage of the stator interface $U_{sabc}$ and the voltage of the rotor interface $U_{rabc}$ to obtain a first grid voltage synthesis vector $U_{g1\alpha\beta}$ a second grid voltage synthesis vector $U_{g2\alpha\beta}$, a stator synthesis vector $U_{s\alpha\beta}$ and a rotor synthesis vector $U_{r\alpha\beta}$ containing positive and negative sequence components in the two-phase static coordinate; carrying out a positive and negative sequence signals separation to the first grid voltage synthesis vector $U_{g1\alpha\beta}$ and the second grid voltage synthesis vector $U_{g2\alpha\beta}$ to obtain a first grid positive sequence voltage vector $U_{g1\alpha\beta+}$, a first grid negative sequence voltage vector $U_{g1\alpha\beta-}$, a second grid positive sequence voltage vector $U_{g2\alpha\beta+}$ and a second grid negative sequence voltage vector $U_{g2\alpha\beta-}$; carrying out a phase angle calculation to the first grid positive sequence voltage vector $U_{g2\alpha\beta+}$, the first grid negative sequence voltage vector $U_{g1\alpha\beta-}$, the second grid positive sequence voltage vector $U_{g2\alpha+}$ and the second grid negative sequence voltage vector $U_{g2\alpha\beta-}$ to obtain a first grid positive sequence voltage phase $\theta_{g1+}$, a first grid negative sequence voltage phase $\theta_{g1-}$, a second grid positive sequence voltage phase $\theta_{g2+}$ and a second grid negative sequence voltage phase $\theta_{g2-}$; carrying out positive and negative sequence signals separation to the stator synthesis vector $U_{s\alpha\beta}$ and the rotor synthesis vector $U_{r\alpha\beta}$ to obtain a stator positive sequence voltage vector $U_{s\alpha\beta+}$, a stator negative sequence voltage vector $U_{s\alpha\beta-}$, a rotor positive sequence voltage vector $U_{s\alpha\beta+}$ and a rotor negative sequence voltage vector $U_{r\alpha\beta-}$ in the two-phase static coordinate; and carrying out two-phase static to two-phase rotating coordinate transformation for the stator positive sequence voltage vector $U_{s\alpha\beta+}$, the stator negative sequence voltage vector $U_{s\alpha\beta-}$, the rotor positive sequence voltage vector $U_{r\alpha\beta+}$ and the rotor negative sequence voltage vector $U_{r\alpha\beta-}$ to obtain the stator positive sequence voltage DC component $U_{sdq+}$, the stator negative sequence voltage DC component $U_{sdq-}$, the rotor positive sequence voltage DC component $U_{rdq+}$ and the rotor negative sequence voltage DC component $U_{rdq-}$ in the two-phase rotating coordinate.

Optionally, the step S103 further comprises: processing the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ according to a first preset voltage control equation to obtain the positive voltage reference value $U_{t1dq+}$ and the negative voltage reference value $U_{t1dq-}$ of the first PWM convertor; and the first preset voltage control equation is showed as $$U_{t1d+} = \left(U_{rd+} \cdot \frac{f_{g1}}{f_{g2}} - U_{sd+}\right)\left(K_{p3} + \frac{K_{t3}}{s}\right)$$

$$U_{t1q+} = \left(U_{rq+} \cdot \frac{f_{g1}}{f_{g2}} - U_{sq+}\right)\left(K_{p3} + \frac{K_{t3}}{s}\right)$$

$$U_{t1d-} = (0 - U_{sd-})\left(K_{p4} + \frac{K_{t4}}{s}\right)$$

$$U_{t1q-} = (0 - U_{sq-})\left(K_{p4} + \frac{K_{t4}}{s}\right)$$

wherein the $K_{p3}$ and the $K_{i3}$ are scale coefficient and integral coefficient of a positive sequence voltage PI regulator in the first PWM convertor, respectively, and the $K_{p4}$ and the $K_{i4}$ are scale coefficient and integral coefficient of a negative sequence voltage PI regulator in the first PWM convertor, respectively; s is the slip rate of the variable frequency transformer; $U_{rd+}$ is the d-axis component of rotor positive sequence voltage in the stator positive sequence synchronous rotating coordinate system; $U_{rq+}$ is the q-axis component of the rotor positive sequence voltage in the stator positive sequence synchronous rotating coordinate system; $U_{sd+}$ is the d-axis component of the stator positive sequence voltage in the stator positive sequence synchronous rotating coordinate system; $U_{sq+}$ is the q-axis component of the stator positive sequence voltage in the stator positive sequence synchronous rotating coordinate system; $U_{sd-}$ is the d-axis component of the stator negative sequence voltage in the stator negative sequence synchronous rotating coordinate system; $U_{sq-}$ is the q-axis component of the stator negative sequence voltage in the stator negative sequence synchronous rotating coordinate system; $U_{t1d+}$ is the d-axis component of the first transformer positive sequence voltage in the stator positive sequence synchronous rotating coordinate system; $U_{t1q+}$ is the q-axis component of the positive sequence voltage of the first transformer in the stator positive sequence synchronous rotating coordinate system; $U_{t1d-}$ is the d-axis component of the first transformer negative sequence voltage in the stator negative sequence synchronous rotating coordinate system; $U_{t1q-}$ is the q-axis component of the negative sequence voltage of the first transformer in the stator negative sequence synchronous rotating coordinate system.

Optionally, the step S104 further comprises: carrying out two-phase rotating to two-phase static coordinate transformation for the voltage reference values $U_{t1dq+}$ and $U_{t1dq-}$ to obtain the positive voltage reference value $U_{t1\alpha\beta+}$ and the negative voltage reference value $U_{t1\alpha\beta-}$ of the first PWM convertor in the two-phase static coordinate; adding the positive voltage reference value $U_{t1\alpha\beta+}$ and the negative voltage reference value $U_{t1\alpha\beta-}$, to obtain a voltage reference signal $U_{t1\alpha\beta}$ of the first PWM convertor in the two-phase static coordinate; and treating the voltage reference signal $U_{t1\alpha\beta}$ a through a space vector PWM module to obtain switch signals for controlling the first PWM convertor $S_a$, $S_b$, $S_c$.

Optionally, the fault ride-through circuit with the VFT further comprises: a second compensating transformer and a second PWM convertor, secondary coils of the second compensating transformer are inserted in series between the second grid and the rotor interface of the VFT, and primary coils of the second compensating transformer are inserted in series between a first input end and a second input end of the PWM convertor. The control method further comprises: carrying out a reference voltage calculation for the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ to obtain a positive voltage reference value $U_{t2dq+}$ and a negative voltage reference value $U_{t2dq-}$ of the second PWM convertor; and processing the voltage reference values $U_{t2dq+}$ and $U_{t2dq-}$ to obtain switch signals for controlling the second PWM convertor $S_a$, $S_b$, $S_c$.

Optionally, the step of carrying out a reference voltage calculation for the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ to obtain a positive voltage reference value $U_{t2dq+}$ and a negative voltage reference value $U_{t2dq-}$ of the second PWM convertor, further comprises: processing the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ according to a second preset voltage control equation to obtain the positive voltage reference value $U_{t2dq+}$ and the negative voltage reference value $U_{t2dq-}$ of the second PWM convertor; and the second preset voltage control equation is showed as $$U_{t2d+} = \left(U_{sd-} \cdot \frac{f_{g2}}{f_{g1}} - U_{rd+}\right)\left(K_{p5} + \frac{K_{t5}}{s}\right)$$

$$U_{t2q+} = \left(U_{sq+} \cdot \frac{f_{g2}}{f_{g1}} - U_{rq+}\right)\left(K_{p5} + \frac{K_{t5}}{s}\right)$$

$$U_{t2d-} = (0 - U_{rd-})\left(K_{p6} + \frac{K_{t6}}{s}\right)$$

$$U_{t2q-} = (0 - U_{rq-})\left(K_{p6} + \frac{K_{t6}}{s}\right)$$

wherein the $K_{p5}$ and the $K_{i5}$ are scale coefficient and integral coefficient of a positive sequence voltage PI regulator in the second PWM convertor, respectively, and the $K_{p6}$ and the $K_{i6}$ are scale coefficient and integral coefficient of a negative sequence voltage PI regulator in the second PWM convertor, respectively; $U_{t2d+}$ is the d-axis component of the positive sequence voltage of the second transformer in the stator positive sequence synchronous rotating coordinate system; $U_{t2q+}$ is the q-axis component of the positive sequence voltage of the second transformer in the stator positive sequence synchronous rotating coordinate system; $U_{t2d-}$ is the d-axis component of the second transformer negative sequence voltage in the stator negative sequence synchronous rotating coordinate system $U_{td+}$ is the d-axis component of the rotor positive sequence voltage in the stator positive sequence synchronous rotating coordinate system; $U_{rq+}$ is the q-axis component of the rotor positive sequence voltage in the stator positive sequence synchronous rotating coordinate system; $U_{rd-}$ is the d-axis component of the rotor negative sequence voltage in the rotor negative sequence synchronous rotating coordinate system; $U_{rd-}$ is the d-axis component of the rotor negative sequence voltage in the stator negative sequence synchronous rotating coordinate system; $U_{rq-}$ is the q-axis component of the rotor negative sequence voltage in the stator negative sequence synchronous rotating coordinate system Optionally, the step of processing the voltage reference values $U_{t2dq+}$ and $U_{t2dq-}$ to obtain switch signals for controlling the second PWM convertor $S_a$, $S_b$, $S_c$, further comprises: carrying out two-phase rotating to two-phase static coordinate transformation for the voltage reference values $U_{t2dq+}$ and $U_{t2dq-}$ to obtain the positive voltage reference value $U_{t2\alpha\beta+}$ and the negative voltage reference value $U_{t2\alpha\beta-}$ of the second PWM convertor in the two-phase static coordinate; adding the positive voltage reference value $U_{t2\alpha\beta+}$ and the negative voltage reference value $U_{t2\alpha\beta-}$ to obtain a voltage reference signal $U_{t2\alpha\beta}$ of the second PWM convertor in the two-phase static coordinate; and treating the voltage reference signal $U_{t2\alpha\beta}$ through a space vector PWM module to obtain switch signals of the second PWM convertor $S_a$, $S_b$, $S_c$.

A fault ride-through circuit with a variable frequency transformer (VFT) provided in the disclosure comprises: a first grid (1), a second grid (2), a VFT (3), a first three-phase rectifier (6), a motor-driven convertor (4), a first compensating circuit (5) and a control circuit (7). The first grid (1) is connected to an input end of the first three-phase rectifier (6) and a first output end of the first compensating circuit (5), a second output end of the first compensating circuit (5) is connected to a stator interface (31) of the VFT (3), an output end of the first three-phase rectifier (6) is simultaneously connected to an input end of the first compensating circuit (5) and an input end of the motor-driven convertor (4), the motor-driven convertor (4) is connected to a driving motor of the VFT (3), a rotor interface (32) of the VFT (3) is connected to the second grid (2), and the control circuit (7) is connected to a control signal input end of the first compensating circuit (5).

Optionally, the first compensating circuit (5) comprises: a first compensating transformer (51) and a first PWM convertor (52); secondary coils of the first compensating transformer (51) are inserted in series between the first grid (1) and the stator interface (31) of the VFT (3), an output end of the first PWM convertor (52) is connected to an input end of the first compensating transformer (51), an input end of the first PWM convertor (52) is connected to the input end of the first compensating circuit (5), and a control signal input end of the first PWM convertor (52) is connected to the control signal input end of the first compensating circuit (5).

Optionally, the input end of the first compensating circuit (5) is connected to a first capacitor.

Optionally, the fault ride-through circuit, further comprises a second three-phase rectifier (8) and a second compensating circuit (9); wherein, the second grid (2) is connected to an input end of the second three-phase rectifier (8) and a first output end of the second compensating circuit (9), a second output end of the second compensating circuit (9) is connected to the rotor interface (32) of the VFT (3), an output of the second three-phase rectifier (8) is simultaneously connected to an input end of the second compensating circuit (9) and the output end of the first three-phase rectifier (6), and a control signal input end of the second compensating circuit (9) is connected to the control circuit (7).

Optionally, the second compensating circuit (9) comprises a second compensating transformer (91) and a second PWM convertor (92), secondary coils of the second compensating transformer (91) are inserted in series between the second grid (2) and the rotor interface (32) of the VFT (3), primary coils of the second compensating transformer (91) are inserted in series between a first output end and a second output end of the PWM convertor (92), an input end of the PWM convertor (92) is connected to the input end of the second compensating circuit (9), and a control signal input end of the PWM convertor (92) is connected to the control signal input end of the second compensating circuit (9).

Optionally, the input end of the second compensating circuit (9) is connected to a second capacitor.

When the grid voltage dip happens, voltage compensation will be performed, the voltage will further be risen, massive short-circuit current will be decreased, so as to avoid excessive current wastage and prevent the voltage dip fault from propagating to the healthy grid.

Moreover, it avoids the torque fluctuation of the VFT when voltage dip happens at one side grid, extending the life of mechanical components and avoiding producing noise pollution.

DESCRIPTION OF THE DRAWINGS

In order to make the technical solutions in the disclosure described more clearly, the drawings associated to the description of the embodiments will be illustrated concisely in the following. Obviously, the drawings described below are only some embodiments according to the disclosure. It is appreciated that more drawings will be obtained by one of ordinary skill in the art based on the drawings described in the disclosure without paying any creative work.

In FIGS. 2-4, 1: first grid, 2: second grid, 3: variable frequency transformer, 31: stator interface, 32: rotor interface, 4: motor-driven convertor, 5: first compensating circuit, 51: first compensating transformer, 52: first PWM convertor, 6: first three-phase rectifier, 7: control circuit, 8: second three-phase rectifier, 9: second compensating circuit, 91: second compensating transformer, 92: PWM convertor.

DETAILED DESCRIPTION OF PREFERRED EMBODIMENTS

In order to describe objects, technical solutions and merits of the disclosure more clearly, the technical solutions will be further illustrated with combination of the accompanying drawings in the disclosure in the following. Obviously, the drawings described below are only some embodiments according to the disclosure. It is appreciated that more drawings will be obtained by one of ordinary skill in the art based on the drawings described in the disclosure without paying any creative work.

The core of the disclosure is to provide a fault ride-through circuit with a VFT and a control method thereof. When the grid voltage dip happens, voltage compensation will be performed by a compensating circuit, the voltage will further be risen, massive short-circuit current will be decreased, so as to avoid excessive current wastage and prevent the voltage dip fault from propagating to the healthy grid.

The First Embodiment

Figure 2:
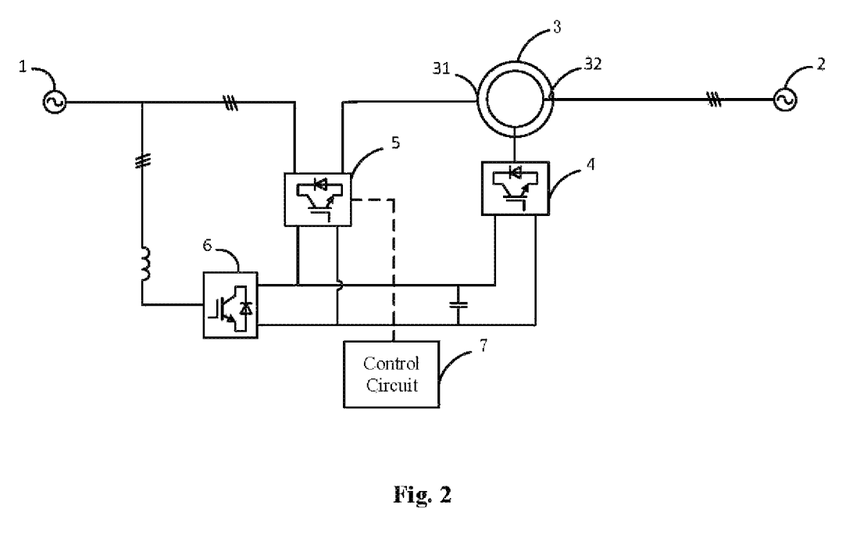
FIG. 2 is a structural schematic diagram of a fault ride-through circuit with a VFT according to an embodiment of the disclosure.

Referring to FIG. 2, FIG. 2 is a structural schematic diagram of a fault ride-through circuit with a VFT according to an embodiment of the disclosure.

A fault ride-through circuit with a VFT provided in the disclosure, which could improve the voltage, decrease short-circuit current and prevent the voltage dip fault from propagating to the healthy grid by compensating reactive power, comprises: a first grid 1, a second grid 2, the VFT 3, a first three-phase rectifier 6, a motor-driven convertor 4, a first compensating circuit 5 and a control circuit 7.

The first grid 1 is connected to an input end of the first three-phase rectifier 6 and a first output end of the first compensating circuit 5, a second output end of the first compensating circuit 5 is connected to a stator interface 31 of the VFT 3, an output end of the first three-phase rectifier 6 is connected to an input end of the first compensating circuit 5 and an input end of the motor-driven convertor 4, the motor-driven convertor 4 is connected to a driving motor of the VFT 3, a rotor interface 32 of the VFT 3 is connected to the second grid 2, and the control circuit 7 is connected to a control signal input end of the first compensating circuit 5.

This embodiment mainly adopts approach of obtaining direct current by the first three-phase rectifier 6 to supply the motor-driven convertor 4 so that the driving motor of the VFT 3 can run normally. However, circuit fault is inevitable to happen, and the short circuit is one of the common circuit faults. When a short circuit happens at one side grid, the voltage magnitudes dip will be caused, namely the voltage of one side grid is decrease rapidly, and the other side of grid will thereby transfer gigantic short-circuit current to the fault grid through the VFT negatively, so as to affect the secure running of the healthy side grid. In addition, excessive short-circuit current can lead to the breakdown of the VFT. Therefore, it is necessary to suppress the voltage magnitudes dip on the fault side and prevent the fault from traversing to the other side of the grid.

The first compensation circuit 5 provided in this embodiment can perform voltage compensation for the first grid 1 through control signals of the control circuit and the compensating circuit. When the voltage dip event happens in the first grid 1, the voltage of the first grid 1 can be improved by voltage compensation, and massive short-circuit current caused be short circuit will be further decreased.

Optionally, the voltage compensation can be implemented by reactive power compensation. Reactive power compensation is a technology applied in the power supply system, which improves the power factor of the power grid, reduces the wastage of the power supply transformer and the transmission line, improves the power supply efficiency, and improves the power supply environment. Implementing reactive power compensation in the circuit will increase the power factor (cos φ) of the circuit, increase system voltage, reduce the wastage of the transformers and the circuits, and increase the load capacity of the transformers and circuits.

After the reactive power compensation is implemented, part of the reactive current consumed in the circuit no longer needs to be absorbed from the system, so that the voltage dip of the compensation circuit is reduced, the voltage is risen, and the current is reduced, which cause a reduction in the wastage of the circuits and the transformers. Part of the reactive current is not absorbed from the system, so that the circuits and transformers can transmit more active energy, which improves the load capacity of the equipment.

In summary, the embodiment provides a voltage compensation circuit, which can perform voltage compensation when a grid voltage dip fault happens in the compensation circuit, thereby increasing the voltage, reducing the great amount of short-circuit current caused by the short circuit, avoiding excessive power wastage and preventing the voltage dip from traversing to the other side of the grid.

It should be noted that the circuits in this embodiment are contralateral circuits, that is, the first grid 1 and the second grid 2 constitute the contralateral circuits. The first compensation circuit 5 is only installed in the first grid 1, consequently only one side can be prevented from the voltage dip fault traverses.

Figure 3:
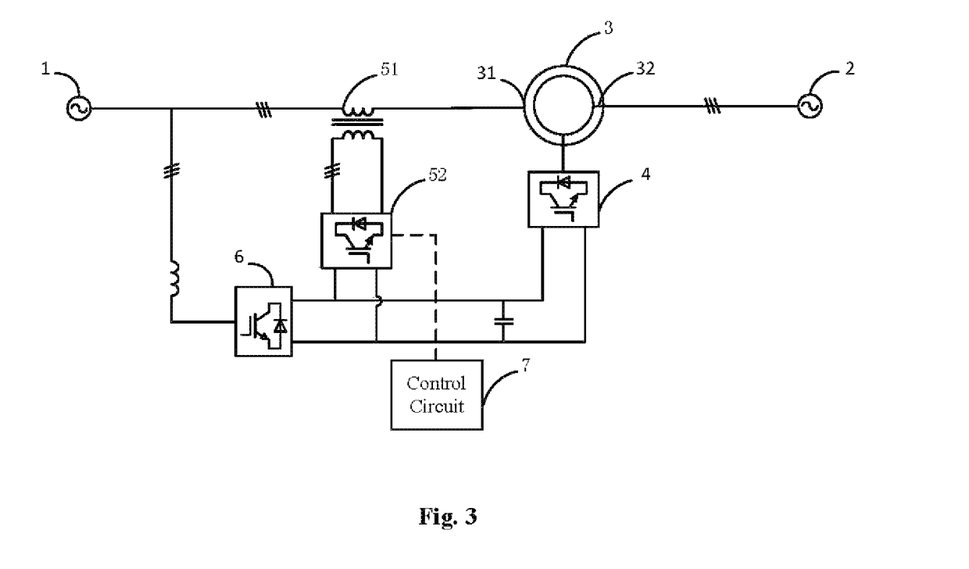
FIG. 3 is a structural schematic diagram of a compensating circuit in a fault ride-through circuit with a VFT according to an embodiment of the disclosure.

Referring to FIG. 3, which is a structural schematic diagram of a compensating circuit in a fault ride-through circuit with a VFT according to an embodiment of the disclosure.

Based on the last embodiment, this embodiment is intended to provide a specific description to the compensation circuit in the last embodiment. The other parts of this embodiment are substantially as same as those of the last embodiment, which could refer to the last embodiment and are not described herein for simplicity.

In this embodiment, the first compensating circuit 5 comprises: a first compensating transformer 51 and the first PWM convertor 52. Secondary coils of the first compensating transformer 51 are inserted in series between the first grid 1 and the stator interface 31 of the VFT 3, an output end of the first PWM convertor 52 is connected to an input end of the first compensating transformer 51, an input end of the first PWM convertor 52 is connected to the input end of the first compensating circuit 5, and a control signal input end of the first PWM convertor 52 is connected to the control signal input end of the first compensating circuit 5.

When receiving a control signal from the control circuit 7, the first PWM converter 52 can output a corresponding current which will compensate the circuits of the grids through the first compensation transformer 51. When receiving a control signal from the control circuit 7, the first PWM converter 52 can rectify the direct current into a corresponding three-phase alternating current, and therefore, the PWM converter can also serve as a PWM rectifier.

The control circuit 7 is mainly to execute a corresponding algorithm to obtain a corresponding control signal. Therefore, the control circuit 7 may be a DSP control board, an embedded control board, or a single chip microcomputer. Generally, the control circuit 7 is a electronic circuit that only supplies control signals to the PWM converter.

Further, the algorithm in the control circuit 7 can be modified according to the needs of the actual application environment, which is not limited herein for simplicity.

Optionally, the input end of the first compensating circuit 5 is grounded via a first capacitor.

The Second Embodiment

Figure 4:
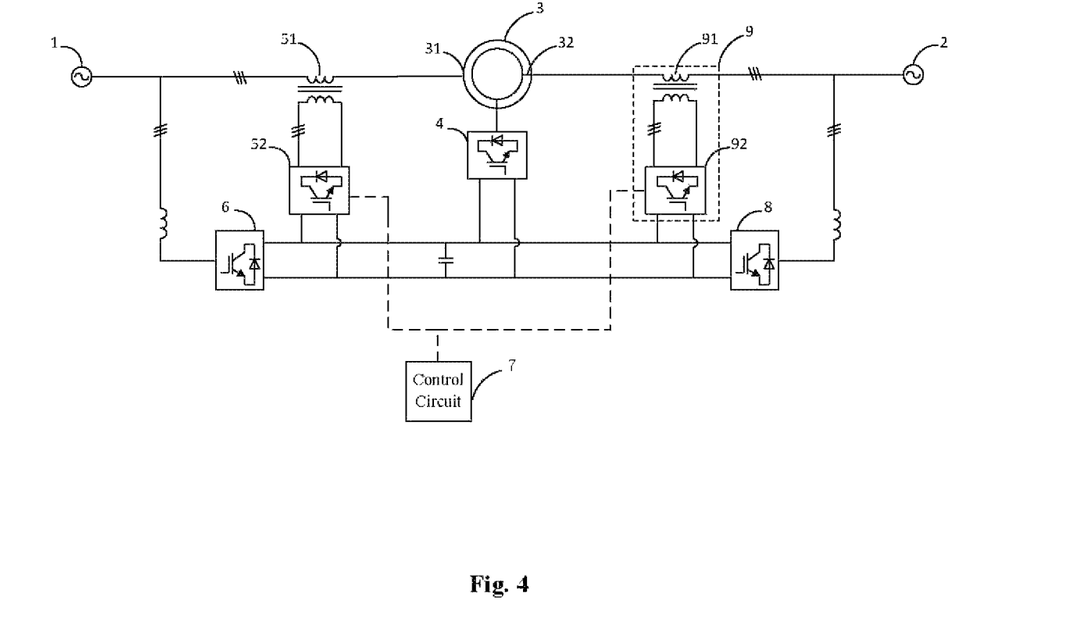
FIG. 4 is a structural schematic diagram of anther fault ride-through circuit with a VFT according to an embodiment of the disclosure.

Referring to FIG. 4, FIG. 4 is a structural schematic diagram of anther fault ride-through circuit with a VFT according to an embodiment of the disclosure.

The first voltage compensation circuit provided in above embodiment of the present disclosure is one-sided compensation, and cannot solve the voltage dip problem on the other side. Therefore, based on the above embodiment of the first voltage compensation circuit, an additional explanation is added in the present embodiment directed to problem of the voltage dip occurring on both sides. The other parts of the present embodiment are substantially as same as the previous embodiment, which can refer to the previous embodiment, and are not described herein.

Based on the first embodiment, the fault ride-through circuit with the VFT provided in this embodiment, further comprises: a second three-phase rectifier 8 and a second compensating circuit 9. The second grid 2 is connected to an input end of the second three-phase rectifier 8 and a first output end of the second compensating circuit 9. A second output end of the second compensating circuit 9 is connected to the rotor interface 32 of the VFT 3. An output of the second three-phase rectifier 8 is simultaneously connected to an input end of the second compensating circuit 9 and the output end of the first three-phase rectifier 6. A control signal input end of the second compensating circuit 9 is connected to the control circuit 7.

Optionally, the second compensating circuit 9 comprises a second compensating transformer 91 and a second PWM convertor 92. Secondary coils of the second compensating transformer 91 are inserted in series between the second grid 2 and the rotor interface 32 of the VFT 3, and primary coils of the second compensating transformer 91 are inserted in series between a first output end and a second output end of the PWM convertor 92. An input end of the PWM convertor 92 is connected to the input end of the second compensating circuit 9, and a control signal input end of the PWM convertor 92 is connected to the control signal input end of the second compensating circuit 9.

In this embodiment, the second three-phase rectifier 8 is adopted to turn the circuit structure into a symmetrical structure, and then the second compensation circuit 9 is connected in the second power grid 2 and the direct current circuit, which makes the whole circuit form a symmetrical structure, so as to solve the problem of voltage dip fault on the other side.

The detailed contents are substantially as same as the first embodiment, which are not described herein for simplicity.

It should be noted that the control of compensation circuit 9 also needs the control circuit 7, so the algorithm in the control circuit 7 needs to be adaptively changed. Since the algorithm of the control signal is substantially as same as the above, which are not described herein for simplicity.

Optionally, the input end of the second compensating circuit 9 is grounded via a second capacitor.

The present embodiment provides a voltage compensation circuit, which can perform voltage compensation when a grid voltage dip fault happens in the compensation circuit, thereby increasing the voltage, reducing the great amount of short-circuit current caused by the short circuit, avoiding excessive power wastage and preventing the voltage dip from traversing to the other side of the grid.

Based on the fault ride-through circuit with the VFT provided in the above embodiment, a control method of fault ride-through circuit with the VFT provided in the embodiment of the present disclosure is described below. The control method of the fault ride-through circuit with the VFT described below and the fault ride-through circuit with the VFT described above can be referred to each other.

Figure 5:
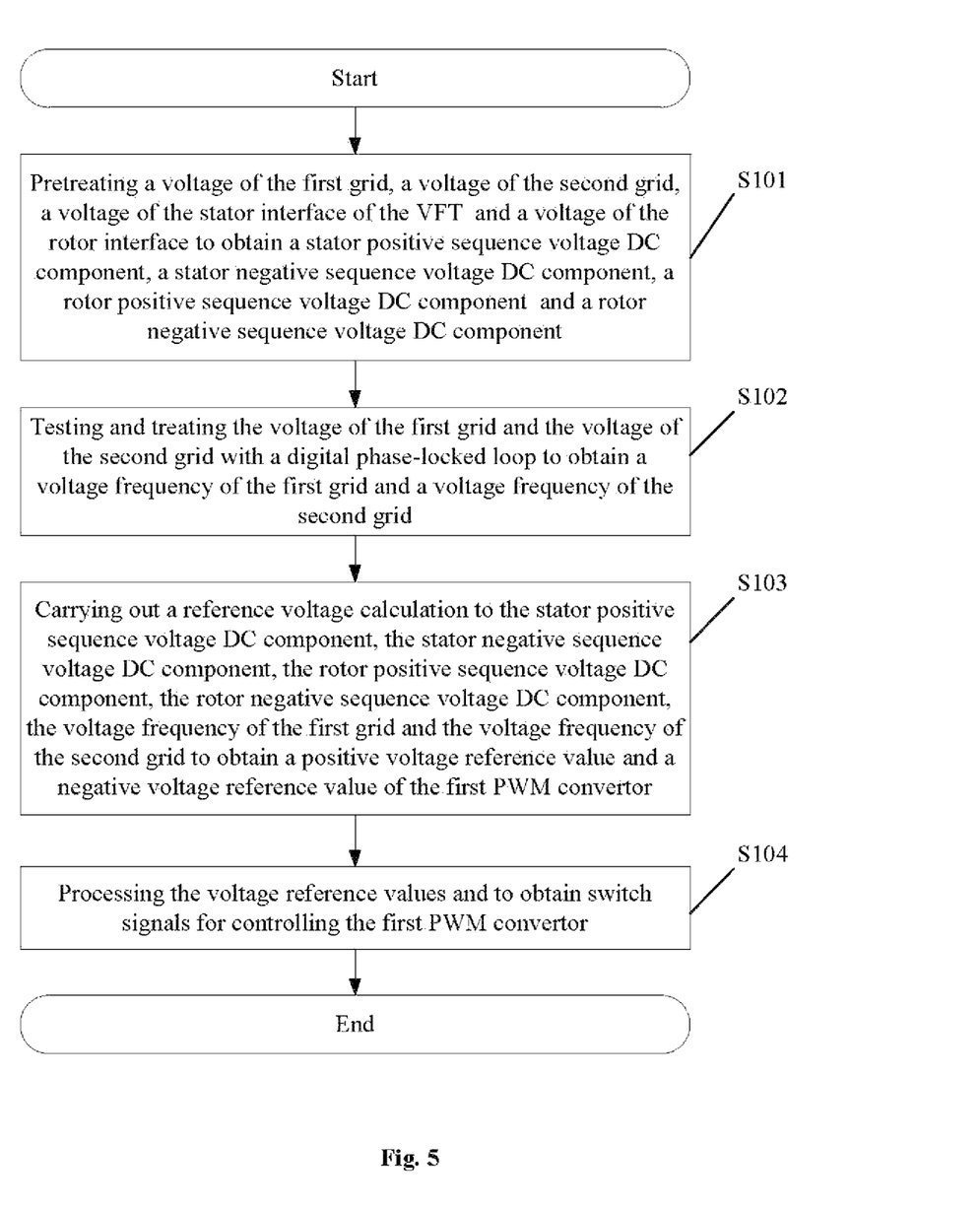
FIG. 5 is a flow chart of a control method of a fault ride-through circuit with a VFT according to an embodiment of the disclosure.

Referring to FIG. 5, FIG. 5 is a flow chart of a control method of a fault ride-through circuit with a VFT according to an embodiment of the disclosure.

The control method of the fault ride-through circuit with the VFT is provided in the present embodiment, which can prevent a fault voltage from crossing the VFT, and the fault ride-through circuit with the VFT applied in any of the above embodiments will be described below with reference to FIG. 2.

The disclosure provides a control method of a fault ride-through circuit with the VFT, comprising:

S101: pretreating a voltage of the first grid $U_{g1abc}$, a voltage of the second grid $U_{g2abc}$, a voltage of the stator interface of the VFT $U_{sabc}$ and a voltage of the rotor interface $U_{rabc}$ to obtain a stator positive sequence voltage DC component $U_{sdq+}$, a stator negative sequence voltage DC component $U_{sdq-}$, a rotor positive sequence voltage DC component $U_{rdq+}$ and a rotor negative sequence voltage DC component $U_{rdq-}$;

S102: testing and treating the voltage of the first grid $U_{g1abc}$ and the voltage of the second grid $U_{g2abc}$ with a dipital phase-locked loop to obtain a voltage frequency of the first grid $f_{g1}$ and a voltage frequency of the second grid $f_{g2}$;

S103: carrying out a reference voltage calculation to the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ to obtain a positive voltage reference value $U_{t1dq+}$ and a negative voltage reference value $U_{t1dq-}$ of the first PWM convertor; and S104: processing the voltage reference values $U_{t1dq+}$ and $U_{t1dq-}$ to obtain switch signals for controlling the first PWM convertor $S_a$, $S_b$, $S_c$.

In some possible designs, the embodiments of the present disclosure may also provide another control method of the fault ride-through circuit with the VFT, which is applied to the fault ride-through circuit with the VFT as shown in FIG. 3 or FIG. 4.

The step S103 further comprises: carrying out a reference voltage calculation for the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$ the voltage frequency of the first grid $f_{g1}$ and the voltage frequency of the second grid $f_{g2}$ to obtain a positive voltage reference value $U_{t1dq+}$ and a negative voltage reference value $U_{t1dq-}$ of the first PWM convertor and a positive voltage reference value $U_{t2dq+}$ and a negative voltage reference value $U_{t2dq-}$ of the second PWM convertor.

The step S104 further comprises: processing the voltage reference values $U_{t2dq+}$ and $U_{t2dq-}$ to obtain switch signals for controlling the first PWM convertor $S_a$, $S_b$, $S_c$ and switch signals for controlling the second PWM convertor $S_{a2}$, $S_{b2}$, $S_{c2}$.

During the running process of the VFT, the fault of voltage asymmetry may happen in the grid of one side of the VFT, which leads to the current flowing through the VFT to be asymmetrical, further causes a torque fluctuation of twice the grid frequency and shortens the life of mechanical equipment.

Therefore, in the case of grid voltage absolute asymmetry, the series-compensated PWM convertor can achieve a complete compensation of the voltage across the VFT by adopting voltage closed-loop control, and eliminate the torque fluctuations caused by the grid voltage asymmetry fault.

The control method described above is a voltage closed-loop control method for the series-compensated PWM converter. The preprocessing refers to the processing of obtaining the positive and negative sequence DC voltage components of the stator and the rotor in the VFT, and the processing of obtaining the voltage frequencies of the first grid and the second grid through the dipital phase locked loop. The voltage calculation process is mainly based on the voltage control equation to calculate the voltage reference value. The specific voltage control method can be set according to the specific application environment, and are not be described herein for simplicity.

By carrying out a control signal to voltage reference value obtained, the control signals for controlling the converter to change the switches can be obtained, and the series-compensated PWM convertor will further be changed to obtain a compensation voltage for compensating the control circuit.

Figure 6:
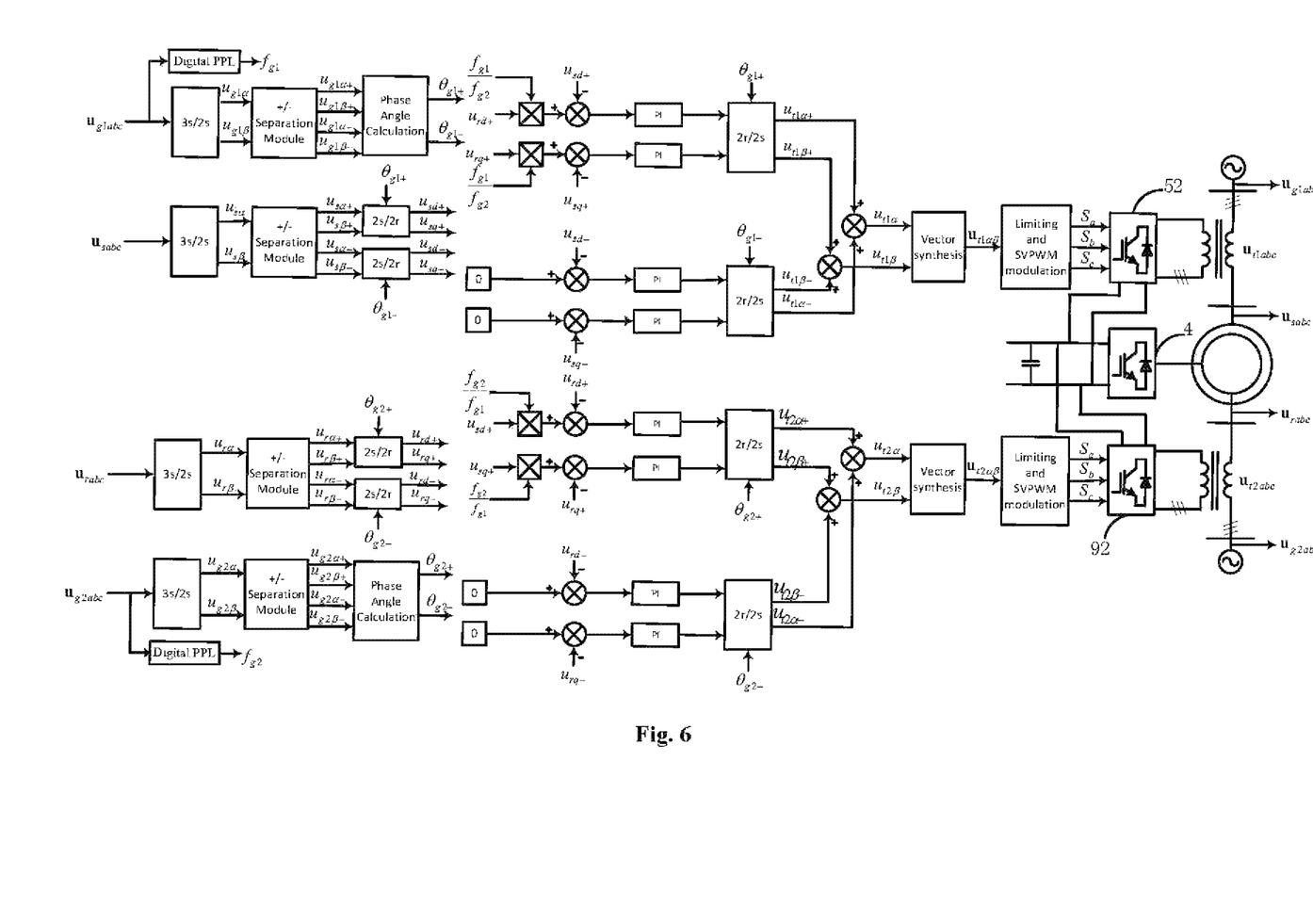
FIG. 6 is a block diagram of a control method of a fault ride-through circuit with a VFT according to an embodiment of the disclosure.

Referring to FIG. 6, FIG. 6 is a block diagram of a control method of a fault ride-through circuit with a VFT according to an embodiment of the disclosure.

Based on the steps in the last embodiment, and referring to the block diagram in FIG. 6, the control method of a fault ride-through circuit with the VFT, comprises:

(1) acquiring the voltage of the first grid $U_{g1ac}$, the voltage of the second grid $U_{g2abc}$, the voltage of the stator interface $U_{sabc}$ and the voltage of the rotor interface $U_{rabc}$ by a voltage sensor with corresponding position (2) testing and treating the voltage of the first grid $U_{g1abc}$ and the voltage of the second grid $U_{g2abc}$ with a dipital phase-locked loop to obtain a voltage frequency of the first grid $f_{g1}$ and a voltage frequency of the second grid $f_{g2}$;

(3) carrying out three-phase static to two-phase static coordinate transformation to the voltage of the first grid $U_{g1abc}$, the voltage of the second grid $U_{g2abc}$, the voltage of the stator interface $U_{sabc}$ and the voltage of the rotor interface rabc to obtain a first grid voltage synthesis vector $U_{g1\alpha\beta}$, a second grid voltage synthesis vector $U_{g2\alpha\beta}$, a stator synthesis vector $U_{s\alpha\beta}$ and a rotor synthesis vector $U_{r\alpha\beta}$ containing positive and negative sequence components in the two-phase static coordinate;

(4) carrying out a positive and negative sequence signals separation to the first grid voltage synthesis vector $U_{g1\alpha\beta}$ and the second grid voltage synthesis vector $U_{g2\alpha\beta}$ to obtain a first grid positive sequence voltage vector $U_{g1\alpha+}$, a first grid negative sequence voltage vector $U_{g1\alpha\beta-}$, a second grid positive sequence voltage vector $U_{g2\alpha\beta+}$ and a second grid negative sequence voltage vector $U_{g2\alpha\beta-}$; carrying out a phase angle calculation to the first grid positive sequence voltage vector $U_{g1\alpha\beta+}$, the first grid negative sequence voltage vector $U_{g1\alpha\beta-}$, the second grid positive sequence voltage vector $U_{g2\alpha\beta+}$ and the second grid negative sequence voltage vector $U_{g2\alpha\beta-}$ to obtain a first grid positive sequence voltage phase $\theta_{g1+}$, a first grid negative sequence voltage phase $\theta_{g1-}$, a second grid positive sequence voltage phase $\theta_{g2+}$ and a second grid negative sequence voltage phase $\theta_{g2-}$;

(5) carrying out positive and negative sequence signals separation to the stator synthesis vector $U_{s\alpha\beta}$ and the rotor synthesis vector $U_{\alpha\beta}$ to obtain a stator positive sequence voltage vector $U_{s\alpha\beta+}$, a stator negative sequence voltage vector $U_{s\alpha\beta-}$, a rotor positive sequence voltage vector $U_{r\alpha\beta+}$ and a rotor negative sequence voltage vector $U_{r\alpha\beta-}$ in the two-phase static coordinate;

(6) carrying out two-phase static to two-phase rotating coordinate transformation for the stator positive sequence voltage vector $U_{s\alpha\beta+}$, the stator negative sequence voltage vector $U_{s\alpha\beta-}$, the rotor positive sequence voltage vector $U_{r\alpha\beta+}$ and the rotor negative sequence voltage vector $U_{r\alpha\beta-}$ to obtain the stator positive sequence voltage DC component $U_{sdq+}$, the stator negative sequence voltage DC component $U_{sdq-}$, the rotor positive sequence voltage DC component $U_{rdq+}$ and the rotor negative sequence voltage DC component $U_{rdq-}$ in synchronous rotating coordinate;

(7) processing the stator positive sequence voltage DC component $U_{sdq+}$, the stator negative sequence voltage DC component $U_{sdq-}$ the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ according to a first preset voltage control equation and a second preset voltage control equation to obtain the positive voltage reference value $U_{t1dq+}$ and the negative voltage reference value $U_{t1dq-}$ of the first PWM convertor and the positive voltage reference value $U_{t2dq+}$ and the negative voltage reference value $U_{t2dq-}$ of the second PWM convertor, wherein the first preset voltage control equation and the second preset voltage control equation are showed respectively as $$U_{t1d+} = \left(U_{rd+} \cdot \frac{f_{g1}}{f_{g2}} - U_{sd+}\right)\left(K_{p3} + \frac{K_{i3}}{s}\right),$$

-continued $$U_{t1q+} = \left(U_{rq+} \cdot \frac{f_{g1}}{f_{g2}} - U_{sq+}\right)\left(K_{p3} + \frac{K_{t3}}{s}\right),$$

$$U_{t1d-} = (0 - U_{sd-})\left(K_{p4} + \frac{K_{t4}}{s}\right),$$

$$U_{t1q-} = (0 - U_{sq-})\left(K_{p4} + \frac{K_{t4}}{s}\right); \text{ and}$$

$$U_{t2d+} = \left(U_{sd+} \cdot \frac{f_{g2}}{f_{g1}} - U_{rd+}\right)\left(K_{p5} + \frac{K_{t5}}{s}\right),$$

$$U_{t2q+} = \left(U_{sq+} \cdot \frac{f_{g2}}{f_{g1}} - U_{rq+}\right)\left(K_{p5} + \frac{K_{t5}}{s}\right),$$

$$U_{t2d-} = (0 - U_{rd-})\left(K_{p6} + \frac{K_{t6}}{s}\right),$$

$$U_{t2q-} = (0 - U_{rq-})\left(K_{p6} + \frac{K_{t6}}{s}\right);$$

wherein the $K_{p3}$ and the $K_{i3}$ are scale coefficient and integral coefficient of a positive sequence voltage PI regulator in the first PWM convertor, respectively, the $K_{p4}$ and the $K_{i4}$ are scale coefficient and integral coefficient of a negative sequence voltage PI regulator in the first PWM convertor, respectively, the $K_{p5}$ and the $K_{i5}$ are scale coefficient and integral coefficient of a positive sequence voltage PI regulator in the second PWM convertor, respectively, and the $K_{p6}$ and the $K_{i6}$ are scale coefficient and integral coefficient of a negative sequence voltage PI regulator in the second PWM convertor, respectively;

(8) carrying out two-phase rotating to two-phase static coordinate transformation for the voltage reference values $U_{t1dq+}$, $U_{t1dq-}$, $U_{t2dq+}$ and $U_{t2dq-}$ to obtain the positive voltage reference value $U_{r\alpha\beta+}$ and the negative voltage reference value $U_{r\alpha\beta-}$ of the first PWM convertor and the positive voltage reference value $U_{r2\alpha\beta+}$ and the negative voltage reference value $U_{r2\alpha\beta-}$ of the second PWM convertor in the two-phase static coordinate;

(9) adding the positive voltage reference value $U_{t1\alpha\beta+}$, the negative voltage reference value $U_{t1\alpha\beta-}$, the positive voltage reference value $U_{t2\alpha\beta+}$ and the negative voltage reference value $U_{t2\alpha\beta-}$ respectively, to obtain a voltage reference signal $U_{t1\alpha\beta}$ of the first PWM convertor and a voltage reference signal $U_{t2\alpha\beta}$ of the second PWM convertor in the two-phase static coordinate;

(10) treating the voltage reference signal $U_{t1\alpha\beta}$ and $U_{t2\alpha\beta}$ through a space vector PWM module to obtain switch signals for controlling the first PWM convertor $S_a$, $S_b$, $S_c$ and switch signals for controlling the second PWM convertor $S_a$, $S_b$, $S_c$.

The control signals generated by the above steps are capable of making the compensation circuit realize a completely compensation of the voltage across the VFT and eliminating the torque fluctuations caused by the grid voltage asymmetry fault.

Based on the circuit structure in above embodiments, another control method of a fault ride-through circuit with the VFT can be provided in the embodiment of the disclosure.

Figure 7:
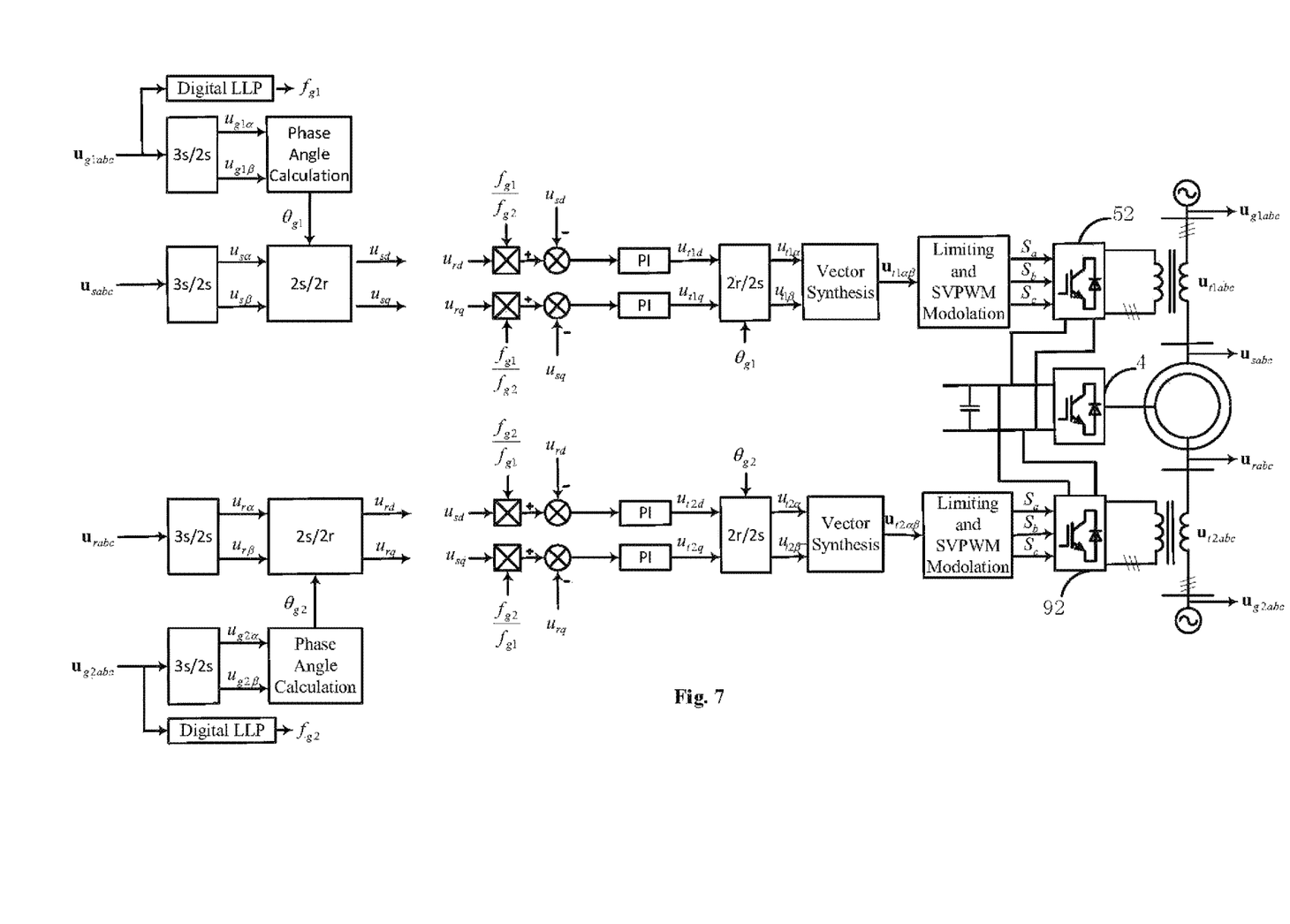
FIG. 7 is a block diagram of a control method of another fault ride-through circuit with a VFT according to an embodiment of the disclosure.

Referring to FIG. 7, FIG. 7 is a block diagram of a control method of another fault ride-through circuit with a VFT according to an embodiment of the disclosure.

A control signal producing method of another compensating circuit applied in the second embodiment can produce corresponding control signals, and the control signal producing method comprises:

(1) acquiring the voltage of the first grid $U_{g1abc}$, the voltage of the second grid $U_{g2abc}$, the voltage of the stator interface $U_{sabc}$ and the voltage of the rotor interface $U_{rabc}$ by a voltage sensor with corresponding position;

(2) testing and treating the voltage of the first grid $U_{g1abc}$ and the voltage of the second grid $U_{g2abc}$ with a dipital phase-locked loop to obtain a voltage frequency of the first grid $f_{g1}$ and a voltage frequency of the second grid $f_{g2}$;

(3) carrying out three-phase static to two-phase static coordinate transformation to the three-phase voltage of the first grid $U_{g1abc}$, the three-phase voltage of the second grid $U_{g2abc}$, the three-phase voltage of the stator interface $U_{sabc}$ and three-phase the voltage of the rotor interface $U_{rabc}$ to obtain a first grid voltage synthesis vector $U_{g1\alpha\beta}$, a second grid voltage synthesis vector $U_{g2\alpha\beta}$, a stator synthesis vector $U_{s\alpha\beta}$ and a rotor synthesis vector $U_{r\alpha\beta}$ in the two-phase static coordinate;

(4) carrying out a phase angle calculation to the first grid voltage synthesis vector $U_{g1\alpha\beta}$ and the second grid voltage synthesis vector $U_{g2\alpha\beta}$ to obtain a first grid voltage phase $\theta_{g1}$ and a second grid voltage phase $\theta_{g2}$;

(5) treating the stator synthesis vector $U_{s\alpha\beta}$ and the rotor synthesis vector $U_{r\alpha\beta-}$ by a two-phase static/synchronous rotating coordinate transformation module to obtain the stator voltage DC component $U_{sdq}$ and the rotor voltage DC component $U_{rdq}$ in the synchronous rotating coordinate;

(6) controlling voltages of the series compensating PWM convertor 1 and the series compensating PWM convertor 2 in the synchronous rotating coordinate with equations shown as $$U_{t1d} = \left(U_{rd} \cdot \frac{f_{g1}}{f_{g2}} - U_{sd}\right)\left(K_{p1} + \frac{K_{i1}}{s}\right);$$

$$U_{t1q} = \left(U_{rq} \cdot \frac{f_{g1}}{f_{g2}} - U_{sq}\right)\left(K_{p1} + \frac{K_{i1}}{s}\right);$$

$$U_{t2d} = \left(U_{sd} \cdot \frac{f_{g2}}{f_{g1}} - U_{rd}\right)\left(K_{p2} + \frac{K_{i2}}{s}\right);$$

$$U_{t2q} = \left(U_{sq} \cdot \frac{f_{g2}}{f_{g1}} - U_{rq}\right)\left(K_{p2} + \frac{K_{i2}}{s}\right);$$

where the $K_{p1}$ and the $K_{i1}$ are scale coefficient and integral coefficient of voltage PI regulator in the series compensating PWM convertor 1, respectively, and the $K_{p2}$ and the $K_{i2}$ are scale coefficient and integral coefficient of a positive sequence voltage PI regulator in the series compensating PWM convertor 2, respectively; $U_{t1d}$ is the d-axis component of the first transformer voltage in the stator synchronous rotating coordinate system; $U_{t1d}$ is the q-axis component of the first transformer voltage in the stator synchronous rotating coordinate system; $U_{t2d}$ is the d-axis component of the second transformer voltage in the stator synchronous rotating coordinate system; Ung is the q-axis component of the second transformer voltage in the stator synchronous rotating coordinate system; $U_{sd}$ is the d-axis component of the stator voltage in the stator synchronous rotating coordinate system; $U_{sq}$ is the q-axis component of the stator voltage in the stator synchronous rotating coordinate system; $U_{rd}$ is the d-axis component of the rotor voltage in the stator synchronous rotating coordinate system; $U_{rq}$ is the q-axis component of the rotor voltage in the stator synchronous rotating coordinate system.

(7) treating the voltage reference value $U_{t1dq}$ and $U_{t2dq}$ of the series compensating PWM convertor 1 and the series compensating PWM convertor 2 by a two-phase static/synchronous rotating coordinate transformation module to obtain the voltage reference values $U_{t1\alpha\beta}$ and $U_{t\alpha\beta}$ of the series compensating PWM convertor 1 and the series compensating PWM convertor 2 in the two phase stationary coordinate;

(8) modulating the voltage reference values $U_{t1\alpha\beta}$ and $U_{t2\alpha\beta}$, of the series compensating PWM convertor 1 and the series compensating PWM convertor 2 through a space vector PWM module to obtain switch signals $S_a$, $S_b$, $S_c$ of power devices of the series compensating PWM convertor 1 and the series compensating PWM convertor 2, respectively.

The series compensating PWM convertor 1 and the series compensating PWM convertor 2 are identical to the first PWM convertor 52 and the second PWM convertor 92.

The embodiment is applied in a symmetrical circuit structure with two compensation circuits, and the control signals of the two compensation circuits have a symmetrical relationship to some extent, so a pair of control signals can be calculated according to the same preset control equation, namely the control signals of the first compensation circuit and the second compensation circuit.

When a grid voltage dip fault happens, the PWM convertor and compensating transformer can be controlled by control signals acquired by the embodiments to perform voltage compensation, so as to increase the system voltage, reduce the corresponding current and prevent the voltage dip from traversing to the other side of the grid.

The various embodiments in this disclosure are described in a progressive manner, each embodiment focuses on differences from other embodiments, and the same or similar parts between different embodiments can be referred to each other. As to the device disclosed in the embodiment, they correspond to the method disclosed in the embodiment, so the description is relatively simple, and the relevant part can be referred to the method part.

Those of ordinary skill in the art will further appreciate that the elements and algorithm steps described in connection with the embodiments disclosed herein can be implemented in electronic hardware, computer software or a combination thereof. In order to clearly illustrate the interchangeability of the hardware and software, the compositions and steps of the various examples have been generally described in terms of function in the above description. The realization of the functions adopts hardware or software depends on the specific application and design constraints of the solution. Those of ordinary skill in the art can adopt different methods for implementing the described functions for each particular application, but such implementation should not be considered as beyond the scope of the present application.

The elements and algorithm steps described in connection with the embodiments disclosed herein can be implemented directly by adopting hardware, a software module executed by a processor, or a combination of both. The software module can be placed in random access memory (RAM), memory, read only memory (ROM), electrically programmable ROM, electrically erasable programmable ROM, register, hard disk, removable disk, CD-ROM, or any other form of storage medium known in the technical field.

The control method of the fault ride-through circuit with VFT and the fault ride-through circuit with the VFT provided in the present disclosure are described in detail above. The principles and implementations of the present application have been described with specific examples, and the description of the above embodiments is only to help understand the methods and the core ideas of the present application. It should be noted that one of the ordinary skill in the art can make various modifications and changes based on the present disclosure without departing from the spirit of the present invention. These modifications and changes should also fall in the protecting scope of the present invention.

What is claimed is:

1. A control method of a fault ride-through circuit with a variable frequency transformer (VFT), wherein, the fault ride-through circuit with the VFT comprises: a first grid, a second grid, the VFT, a first compensating transformer and a first pulse width modulation (PWM) convertor; the first grid is connected to a stator interface of the VFT through secondary coils of the first compensating transformer, primary coils of the first compensating transformer are inserted in series between a first output end and a second output end of the first PWM convertor, and a rotor interface of the VFT is connected to the second grid; and the control method comprises the following steps:

S101: pretreating a voltage of the first grid $U_{g1abc}$, a voltage of the second grid $U_{g2abc}$, a voltage of the stator interface of the VFT $U_{sabc}$ and a voltage of the rotor interface $U_{rabc}$ to obtain a stator positive sequence voltage DC component $U_{sdq+}$, a stator negative sequence voltage DC component $U_{sdq-}$, a rotor positive sequence voltage DC component $U_{rdq+}$ and a rotor negative sequence voltage DC component $U_{rdq-}$;

S102: testing and treating the voltage of the first grid $U_{g1abc}$ and the voltage of the second grid $U_{g2abc}$ with a digital phase-locked loop to obtain a voltage frequency of the first grid $f_{g1}$ and a voltage frequency of the second grid $f_{g2}$;

S103: carrying out a reference voltage calculation to the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ to obtain a positive voltage reference value $U_{t1dq+}$ and a negative voltage reference value $U_{t1dq-}$ of the first PWM convertor; and S104: processing the voltage reference values $U_{t1dq+}$ and $U_{t1dq-}$ to obtain switch signals for controlling the first PWM convertor $S_a$, $S_b$, $S_c$.

2. The control method of claim 1, wherein, the step S101 further comprises:

acquiring the voltage of the first grid $U_{g1abc}$, the voltage of the second grid $U_{g2abc}$, the voltage of the stator interface $U_{sabc}$ and the voltage of the rotor interface $U_{rabc}$ by a voltage sensor;

carrying out three-phase static to two-phase static coordinate transformation to the voltage of the first grid $U_{g1abc}$, the voltage of the second grid $U_{g2abc}$, the voltage of the stator interface $U_{sabc}$ and the voltage of the rotor interface $U_{rabc}$ to obtain a first grid voltage synthesis vector $U_{g1\alpha\beta}$, a second grid voltage synthesis vector $U_{g2\alpha\beta}$, a stator synthesis vector $U_{s\alpha\beta}$ and a rotor synthesis vector $U_{r\alpha\beta}$ containing positive and negative sequence components in a two-phase static coordinate system;

carrying out a positive and negative sequence signals separation to the first grid voltage synthesis vector $U_{g1\alpha\beta}$ and the second grid voltage synthesis vector $U_{g2\alpha\beta}$ to obtain a first grid positive sequence voltage vector $U_{g1\alpha\beta+}$, a first grid negative sequence voltage vector $U_{g1\alpha\beta-}$, a second grid positive sequence voltage vector $U_{g2\alpha\beta+}$ and a second grid negative sequence voltage vector $U_{g2\alpha\beta-}$;

carrying out a phase angle calculation to the first grid positive sequence voltage vector $U_{g1\alpha\beta+}$, the first grid negative sequence voltage vector $U_{g1\alpha\beta-}$, the second grid positive sequence voltage vector $U_{g2\alpha\beta+}$ and the second grid negative sequence voltage vector $U_{g2\alpha\beta-}$ to obtain a first grid positive sequence voltage phase $\theta_{g1+}$, a first grid negative sequence voltage phase $\theta_{g1-}$, a second grid positive sequence voltage phase $\theta_{g2+}$ and a second grid negative sequence voltage phase $\theta_{g2-}$;

carrying out a second positive and negative sequence signals separation to the stator synthesis vector $U_{s\alpha\beta}$ and the rotor synthesis vector $U_{r\alpha\beta}$ to obtain a stator positive sequence voltage vector $U_{s\alpha\beta+}$, a stator negative sequence voltage vector $U_{s\alpha\beta-}$, a rotor positive sequence voltage vector $U_{r\alpha\beta+}$ and a rotor negative sequence voltage vector $U_{r\alpha\beta-}$ in the two-phase static coordinate system; and carrying out two-phase static to two-phase rotating coordinate transformation for the stator positive sequence voltage vector $U_{s\alpha\beta+}$, the stator negative sequence voltage vector $U_{s\alpha\beta-}$, the rotor positive sequence voltage vector $U_{r\alpha\beta+}$ and the rotor negative sequence voltage vector $U_{r\alpha\beta-}$ to obtain the stator positive sequence voltage DC component $U_{sdq+}$, the stator negative sequence voltage DC component $U_{sdq-}$, the rotor positive sequence voltage DC component $U_{rdq+}$ and the rotor negative sequence voltage DC component $U_{rdq-}$ in the two-phase rotating coordinate system.

3. The control method of claim 1, wherein, the step S103 further comprises: processing the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ according to a first preset voltage control equation to obtain the positive voltage reference value $U_{t1dq+}$ and the negative voltage reference value $U_{t1dq-}$ of the first PWM convertor, and the first preset voltage control equation is showed as $$U_{t1d+} = \left(U_{rd+} \cdot \frac{f_{g1}}{f_{g2}} - U_{sd+}\right)\left(K_{p3} + \frac{K_{i3}}{s}\right);$$

$$U_{t1q+} = \left(U_{rq+} \cdot \frac{f_{g1}}{f_{g2}} - U_{sq+}\right)\left(K_{p3} + \frac{K_{i3}}{s}\right);$$

$$U_{t1d-} = (0 - U_{sd-})\left(K_{p4} + \frac{K_{i4}}{s}\right);$$

$$U_{t1q-} = (0 - U_{sq+})\left(K_{p4} + \frac{K_{i4}}{s}\right);$$

where the $K_{p3}$ and the $K_{i3}$ are scale coefficient and integral coefficient of a positive sequence voltage PI regulator in the first PWM convertor, respectively, and the $K_{p4}$ and the $K_{i4}$ are scale coefficient and integral coefficient of a negative sequence voltage PI regulator in the first PWM convertor, respectively s is a slip rate of the variable frequency transformer; $U_{rd+}$ is a d-axis component of a rotor positive sequence voltage in a stator positive sequence synchronous rotating coordinate system; $U_{rq+}$ is a q-axis component of the rotor positive sequence voltage in the stator positive sequence synchronous rotating coordinate system; $U_{sd+}$ is a d-axis component of a stator positive sequence voltage in the stator positive sequence synchronous rotating coordinate system; $U_{sq+}$ is a q-axis component of the stator positive sequence voltage in the stator positive sequence synchronous rotating coordinate system; $U_{sd-}$ is a d-axis component of a stator negative sequence voltage in a stator negative sequence synchronous rotating coordinate system; $U_{sq-}$ is a q-axis component of the stator negative sequence voltage in the stator negative sequence synchronous rotating coordinate system; $U_{t1d+}$ is a d-axis component of a positive sequence voltage of the first transformer in the stator positive sequence synchronous rotating coordinate system; $U_{t1q+}$ is a q-axis component of the positive sequence voltage of the first transformer in the stator positive sequence synchronous rotating coordinate system; $U_{t1d-}$ is a d-axis component of a negative sequence voltage of the first transformer in the stator negative sequence synchronous rotating coordinate system; $U_{t1q-}$ is a q-axis component of the negative sequence voltage of the first transformer in the stator negative sequence synchronous rotating coordinate system.

4. The control method according to claim 3, wherein, the step S104 comprises:

carrying out two-phase rotating to two-phase static coordinate transformation for the voltage reference values $U_{t1dq+}$ and $U_{t1dq-}$ to obtain a positive voltage reference value $U_{t1dq+}$ and a negative voltage reference value $U_{t1dq-}$ of the first PWM convertor in the two-phase static coordinate system;

adding the positive voltage reference value $U_{t1\alpha\beta+}$ and the negative voltage reference value $U_{t1\alpha\beta-}$ to obtain a voltage reference signal $U_{t1\alpha\beta}$ of the first PWM convertor in the two-phase static coordinate system; and treating the voltage reference signal $U_{t1\alpha\beta}$ through a space vector PWM module to obtain the switch signals for controlling the first PWM convertor $S_a$, $S_b$, $S_c$.

5. The control method of claim 1, wherein the fault ride-through circuit with the VFT further comprises: a second compensating transformer and a second PWM convertor, secondary coils of the second compensating transformer are inserted in series between the second grid and the rotor interface of the VFT, and primary coils of the second compensating transformer are inserted in series between a first input end and a second input end of the PWM convertor; and the control method further comprises:

carrying out a second reference voltage calculation for the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ to obtain the positive voltage reference value $U_{t2dq+}$ and the negative voltage reference value $U_{t2dq-}$ of the second PWM convertor; and processing the voltage reference values $U_{t2dq+}$ and $U_{t2dq-}$ to obtain switch signals for controlling the second PWM convertor $S_{a2}$ $S_{b2}$ and $S_{c2}$.

6. The control method of claim 5, wherein, the step of carrying out a reference voltage calculation for the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ to obtain a positive voltage reference value $U_{t2dq+}$ and a negative voltage reference value $U_{t2dq-}$ of the second PWM convertor, further comprises:

processing the stator positive sequence voltage DC component $U_{sdq+}$, the stator negative sequence voltage DC component $U_{sdq-}$, the rotor positive sequence voltage DC component $U_{rdq+}$, the rotor negative sequence voltage DC component $U_{rdq-}$, the voltage frequency of the first grid $f_{g1}$ and the voltage frequency of the second grid $f_{g2}$ according to a second preset voltage control equation to obtain the positive voltage reference value $U_{t2dq+}$ and the negative voltage reference value $U_{t2dq-}$ of the second PWM convertor, and the second preset voltage control equation is showed as $$U_{t2d+} = \left(U_{sd-} \cdot \frac{f_{g2}}{f_{g1}} - U_{rd+}\right)\left(K_{p5} + \frac{K_{t5}}{s}\right);$$

$$U_{t2q+} = \left(U_{sq+} \cdot \frac{f_{g2}}{f_{g1}} - U_{rq+}\right)\left(K_{p5} + \frac{K_{t5}}{s}\right);$$

$$U_{t2d-} = (0 - U_{rd-})\left(K_{p6} + \frac{K_{t6}}{s}\right);$$

$$U_{t2q-} = (0 - U_{rq-})\left(K_{p6} + \frac{K_{t6}}{s}\right);$$

where the $K_{p5}$ and the $K_{t5}$ are scale coefficient and integral coefficient of a positive sequence voltage PI regulator in the second PWM convertor, respectively, and the $K_{p6}$ and the $K_{t6}$ are scale coefficient and integral coefficient of a negative sequence voltage PI regulator in the second PWM convertor, respectively; s is a slip rate of the variable frequency transformer; $U_{t2d+}$ is a d-axis component of a positive sequence voltage of a second transformer in a stator positive sequence synchronous rotating coordinate system; $U_{t2q+}$ is a q-axis component of the positive sequence voltage of the second transformer in the stator positive sequence synchronous rotating coordinate system; $U_{t2d-}$ is a d-axis component of a negative sequence voltage of the second transformer in a stator negative sequence synchronous rotating coordinate system; $U_{t2q-}$ is a q-axis component of the negative sequence voltage of the second transformer in the stator negative sequence synchronous rotating coordinate system; $U_{rd+}$ is a d-axis component of a rotor positive sequence voltage in the stator positive sequence synchronous rotating coordinate system; $U_{rq+}$ is a q-axis component of the rotor positive sequence voltage in the stator positive sequence synchronous rotating coordinate system; $U_{rd-}$ is a d-axis component of a rotor negative sequence voltage in the stator negative sequence synchronous rotating coordinate system; $U_{rq-}$ is a q-axis component of the rotor negative sequence voltage in the stator negative sequence synchronous rotating coordinate system.

7. The control method of claim 6, wherein, the step of processing the voltage reference values $U_{t2dq+}$ and $U_{t2dq-}$ to obtain the switch signals for controlling the second PWM convertor $S_{a2}$ $S_{b2}$ and $S_{c2}$ further comprises:

carrying out two-phase rotating to two-phase static coordinate transformation for the voltage reference values $U_{t2dq+}$ and $U_{t2dq-}$ to obtain a positive voltage reference value $U_{t2\alpha\beta+}$ and a negative voltage reference value $U_{t2\alpha\beta-}$ of the second PWM convertor in the two-phase static coordinate system;

adding the positive voltage reference value $U_{t2\alpha\beta+}$ and the negative voltage reference value $U_{t2\alpha\beta-}$, to obtain a voltage reference signal $U_{t2\alpha\beta}$ of the second PWM convertor in the two-phase static coordinate system; and treating the voltage reference signal $U_{t2\alpha\beta}$ through a space vector PWM module to obtain the switch signals for controlling the second PWM convertor $S_{a2}$ $S_{b2}$ and $S_{c2}$.

* * * * *